US012145594B2

United States Patent
Corral et al.

(10) Patent No.: US 12,145,594 B2
(45) Date of Patent: Nov. 19, 2024

(54) VEHICLE DRIVER'S LICENSING SYSTEMS AND METHODS

(71) Applicant: MAGNA ELECTRONICS, LLC, Southfield, MI (US)

(72) Inventors: Christopher Corral, Mesa, AZ (US); Caroline Chung, Royal Oak, MI (US); Alexandru Orban, Lugoj (RO); Trinten Patten, Clio, MI (US)

(73) Assignee: VEONEER US LLC, Southfield, MI (US)

( * ) Notice: Subject to any disclaimer, the term of this patent is extended or adjusted under 35 U.S.C. 154(b) by 234 days.

(21) Appl. No.: 17/556,107

(22) Filed: Dec. 20, 2021

(65) Prior Publication Data
US 2023/0192096 A1 Jun. 22, 2023

(51) Int. Cl.
*B60W 40/08* (2012.01)
*B60R 22/48* (2006.01)
(Continued)

(52) U.S. Cl.
CPC ............ *B60W 40/08* (2013.01); *B60R 22/48* (2013.01); *B60W 30/12* (2013.01); *B60W 30/18109* (2013.01); *B60W 50/16* (2013.01); *B60R 2022/4891* (2013.01); *B60W 2040/0836* (2013.01); *B60W 2040/0845* (2013.01); *B60W 2040/0881* (2013.01); *B60W 2050/143* (2013.01); *B60W 2050/146* (2013.01); *B60W 2540/043* (2020.02); *B60W 2540/24* (2013.01); *B60W 2540/26* (2013.01); *B60W 2710/18* (2013.01)

(58) Field of Classification Search
CPC ................ B60W 40/08; B60W 30/12; B60W 30/18109; B60W 50/16; B60W 2540/043; B60W 2040/0836; B60W 2040/0845; B60W 2040/0881; B60W 2050/143; B60W 2050/146; B60W 2540/24; B60W 2540/26; B60W 2710/18; B60R 2022/4891
USPC ......................................................... 340/576
See application file for complete search history.

(56) References Cited

U.S. PATENT DOCUMENTS

2007/0239992 A1* 10/2007 White .................. B60K 28/063
 713/186
2010/0045452 A1* 2/2010 Periwal .................... B60Q 9/00
 340/439

(Continued)

FOREIGN PATENT DOCUMENTS

JP 2021026687 A * 2/2021

*Primary Examiner* — Kam Wan Ma

(57) ABSTRACT

A system includes: a first camera configured to capture first images of a driver on a driver's seat within a passenger cabin of a vehicle; a second camera configured to capture second images in front of the vehicle; a driver module configured to determine a driver of the vehicle based on at least one of the first images and to determine a present driver's licensing level of the driver with a driver's licensing body; a first detection module configured to detect first occurrences of first conditions within the passenger cabin of the vehicle based on the first images; a second detection module configured to detect second occurrences of second conditions outside of the vehicle; and a reporting module configured to, based on the present driver's licensing level of the driver, selectively generate a report including at least one of the first and second occurrences.

19 Claims, 7 Drawing Sheets

(51) Int. Cl.
  *B60W 30/12* (2020.01)
  *B60W 30/18* (2012.01)
  *B60W 50/14* (2020.01)
  *B60W 50/16* (2020.01)

(56) References Cited

U.S. PATENT DOCUMENTS

| | | | |
|---|---|---|---|
| 2012/0112879 A1* | 5/2012 | Ekchian | A61B 5/14546 |
| | | | 340/5.53 |
| 2015/0084761 A1* | 3/2015 | Bailey | B60W 40/08 |
| | | | 340/439 |
| 2018/0339706 A1* | 11/2018 | Biondo | B60K 28/06 |
| 2019/0147262 A1* | 5/2019 | Kuehnle | B60W 40/09 |
| | | | 340/439 |
| 2019/0202464 A1* | 7/2019 | McGill | B60W 60/0053 |
| 2021/0004002 A1* | 1/2021 | Wengreen | G05D 1/0088 |
| 2023/0026640 A1* | 1/2023 | Thomas | B60R 22/48 |
| 2023/0066476 A1* | 3/2023 | Ludwig | G01C 21/3626 |

* cited by examiner

VEHICLE DRIVER'S LICENSING SYSTEMS AND METHODS

FIELD

The present disclosure relates to vehicle driver monitoring systems and methods and more particularly to systems and methods for dynamically adjusting an attention zone of a driver.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Driver monitoring systems of vehicles include a camera that faces the driver of a vehicle. Images from the camera are used during driving to monitor for alertness of the driver. Driver monitoring systems may also determine how actively the driver is paying attention to the environment in front of the vehicle.

The camera may be, for example, mounted on a steering wheel of the vehicle or in another suitable location. Images from the camera may be used to monitor driver fatigue. When fatigue or a lack of attention of the driver is detected, the driver may be alerted.

SUMMARY

In a feature, a driver reporting and aid system of a vehicle includes: a first camera configured to capture first images of a driver on a driver's seat within a passenger cabin of the vehicle; a second camera configured to capture second images in front of the vehicle; a driver module configured to determine a driver of the vehicle based on at least one of the first images and to determine a present driver's licensing level of the driver with a driver's licensing body based on the driver, the licensing level being less than fully licensed; a first detection module configured to detect first occurrences of first conditions within the passenger cabin of the vehicle based on the first images; a second detection module configured to detect second occurrences of second conditions outside of the vehicle; a reporting module configured to, based on the present driver's licensing level of the driver, selectively generate a report including at least one of the first occurrences of the first conditions and the second occurrences of the second conditions; and a transceiver module configured to wirelessly transmit the report to an entity.

In further features, one of the first conditions includes the driver not wearing a seatbelt properly.

In further features, a propulsion control module is configured to one of shift a transmission to park and to maintain a transmission in park in response to the first detection module detecting that the driver is not wearing the seatbelt properly.

In further features, one of the first conditions includes the driver using a portable electronic device.

In further features, an alert module is configured to, in response to the first detection module detecting that the driver is using a portable electronic device, output at least one of a visual alert via a visual output device, an audible alert via a speaker, and a haptic alert via a vibrating device.

In further features, one of the first conditions includes more than a predetermined number of passengers being present within the passenger cabin.

In further features, a propulsion control module is configured to one of shift a transmission to park and to maintain a transmission in park in response to the first detection module detecting that more than the predetermined number of passengers are present within the passenger cabin.

In further features, one of the first conditions includes the driver using at least one of alcohol and drugs.

In further features, a propulsion control module is configured to one of shift a transmission to park and to maintain a transmission in park in response to the first detection module detecting the use of at least one of alcohol and drugs by the driver.

In further features, one of the first conditions includes the driver at least one of eating, drinking, and smoking.

In further features, an alert module is configured to, in response to the first detection module detecting that the driver is at least one of eating, smoking, and drinking, output at least one of a visual alert via a visual output device, an audible alert via a speaker, and a haptic alert via a vibrating device.

In further features, one of the second conditions is a distance between the vehicle and a second vehicle in front of the vehicle being less than a predetermined distance.

In further features, an alert module is configured to, in response to the second detection module detecting that the distance is less than the predetermined distance, output at least one of a visual alert via a visual output device, an audible alert via a speaker, and a haptic alert via a vibrating device.

In further features, one of the second conditions is a distance between the vehicle and a road boundary being less than a predetermined distance.

In further features, an alert module is configured to, in response to the second detection module detecting that the distance is less than the predetermined distance, output at least one of a visual alert via a visual output device, an audible alert via a speaker, and a haptic alert via a vibrating device.

In further features, one of the second conditions is a lane change without use of a turn signal.

In further features, an alert module is configured to, in response to the second detection module detecting the lane change without the use of the turn signal, output at least one of a visual alert via a visual output device, an audible alert via a speaker, and a haptic alert via a vibrating device.

In further features, one of the second conditions is failure to bring the vehicle stop at one of a stop sign and a red traffic signal.

In further features, the second detection module is configured to: when the present driver's licensing level of the driver is a first licensing level, set the second conditions to a first predetermined set of conditions; and when the present driver's licensing level of the driver is a second licensing level that is closer to full licensing, set the second conditions to a second predetermined set of conditions that includes less conditions than the first predetermined set of conditions.

In a feature, a driver reporting and aid method for a vehicle includes: using a first camera, capturing first images of a driver on a driver's seat within a passenger cabin of the vehicle; using a second camera, capturing second images in front of the vehicle; determining a driver of the vehicle based on at least one of the first images; determining a present driver's licensing level of the driver with a driver's licensing body based on the driver, the licensing level being less than fully licensed; detecting first occurrences of first conditions within the passenger cabin of the vehicle based on the first images; detecting second occurrences of second conditions outside of the vehicle; based on the present driver's licensing level of the driver, selectively generating a report including at least one of the first occurrences of the first conditions and the second occurrences of the second conditions; and selectively wirelessly transmitting the report to an entity.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Images from a passenger cabin camera of a vehicle may be used to detect objects and conditions within the passenger cabin, such as a gaze of a driver, a number of passengers, mobile device usage, alcohol and drug usage, etc. Images from a forward facing camera of a vehicle may be used to detect objects and conditions and the road in front of the vehicle.

Youth drivers seeking to be licensed (e.g., by states) to drive vehicles may have to complete one or more levels of training before being fully licensed. The level(s) may have multiple requirements. For example, in some states to graduate from a first level of license (e.g., learners permit) to a second level of license (e.g., intermediate/provisional license), a youth driver may need to accumulate 50 hours of driving with no "critical" conditions occurring. Examples of critical conditions include alcohol or drug use, driving without a seatbelt, exceeding a posted speed limit by more than a predetermined amount, not using a personal electronic device, and having more than a predetermined number (e.g., 1) of youth passenger in the vehicle at any time. The driving may need to be supervised by an adult during driving with the first level. To graduate from the second level of license to full licensing, the youth driver may need to accumulate another 50 hours of driving with no critical conditions.

The present application involves using vehicle sensors and cameras to monitor and regulate driving during licensing and also to provide driving aids, feedback, and reports for youth drivers during licensing. Information obtained during licensing can be tracked and transmitted, for example, to a licensing body as evidence of completion of a level of licensing, to a parent (or other user) associated with a youth driver, to an insurance company (e.g., for insurance coverage pricing), and/or for one or more other reasons.

Figure 1:
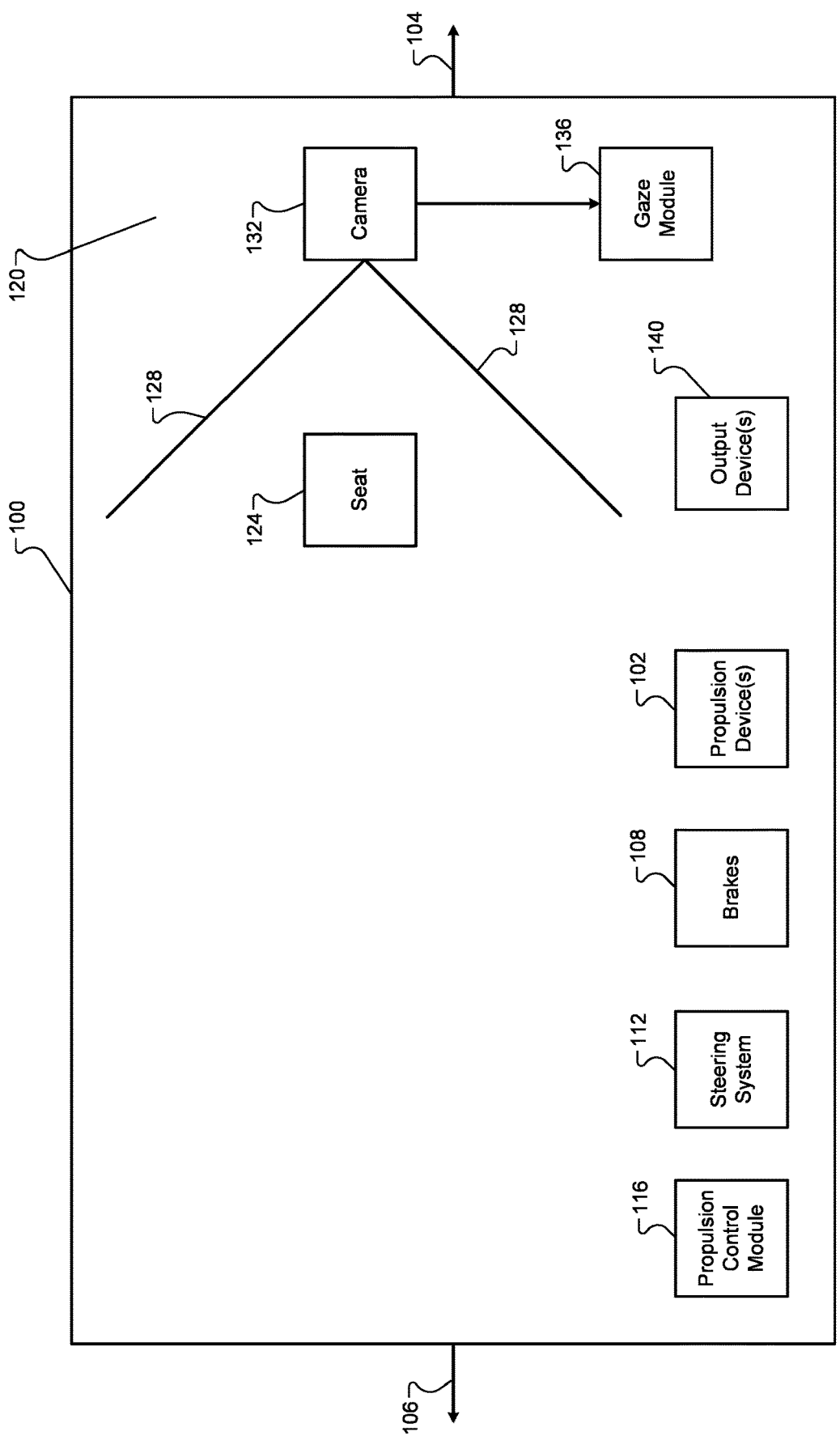
FIG. 1 is a functional block diagram of an example implementation of a vehicle.

FIG. 1 is a functional block diagram of an example vehicle 100 including one or more propulsion devices. The vehicle 100 may be a vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices 102, such as at least one of an electric motor and an internal combustion engine, that generate propulsion torque that is used to propel the vehicle 100. Forward and backward directions of the vehicle 100 are illustrated by arrows 104 and 106. The vehicle 100 includes mechanical (friction) brakes 108 that decelerate the vehicle 100 when actuated. The vehicle 100 includes a steering system 112 that steers the vehicle 100 when actuated. The steering system 112 may be, for example, an electric power steering system or another suitable type of steering system.

A propulsion control module 116 controls the steering system 112, the brakes 108, and the propulsion device(s) 102. The propulsion control module 116 may control positive torque output from the propulsion device(s) 102 based on at least one of (a) an accelerator pedal position and (b) autonomous or semiautonomous driving input. The propulsion control module 116 may control actuation of the brakes 108 based on at least one of (a) a brake pedal position and (b) autonomous or semiautonomous driving input. The propulsion control module 116 may control actuation of the steering system 112 based on at least one of (a) a steering wheel angle and (b) autonomous or semiautonomous driving input. For example, the propulsion control module 116 may actuate the steering system 112 to maintain the vehicle 100 between lane lines of a present lane.

The vehicle 100 includes a passenger cabin 120. A driver's seat 124 is disposed within the passenger cabin 120. While only the driver's seat 124 is shown for simplicity, one or more additional seats may also be disposed within the passenger cabin 120.

The driver's seat 124 is disposed within a field of view (FOV) 128 of a passenger cabin camera 132. One, more than one, or all of the other seats of the vehicle may also be within the FOV of the camera 132 or another passenger cabin camera. While an example horizontal FOV is shown, the FOV 128 may be greater than or lesser than the example FOV shown. Because the driver's seat 124 is disposed within the FOV 128, a portion of a driver (e.g., an upper torso and head of the driver) sitting on the driver's seat 124 is captured in images captured by the camera 132.

A gaze module 136 identifies eyes of the driver and pupils of the eyes, respectively. The gaze module 136 determines a gaze indicative of a direction of the pupils of the driver based on the position of the camera 132 and the direction of the pupils. The gaze is used to determine whether the driver is looking within a driver monitoring system (DMS) area while the vehicle is moving in the forward direction. The DMS area is an area on a vertical plane in front of the vehicle 100.

Figure 2:
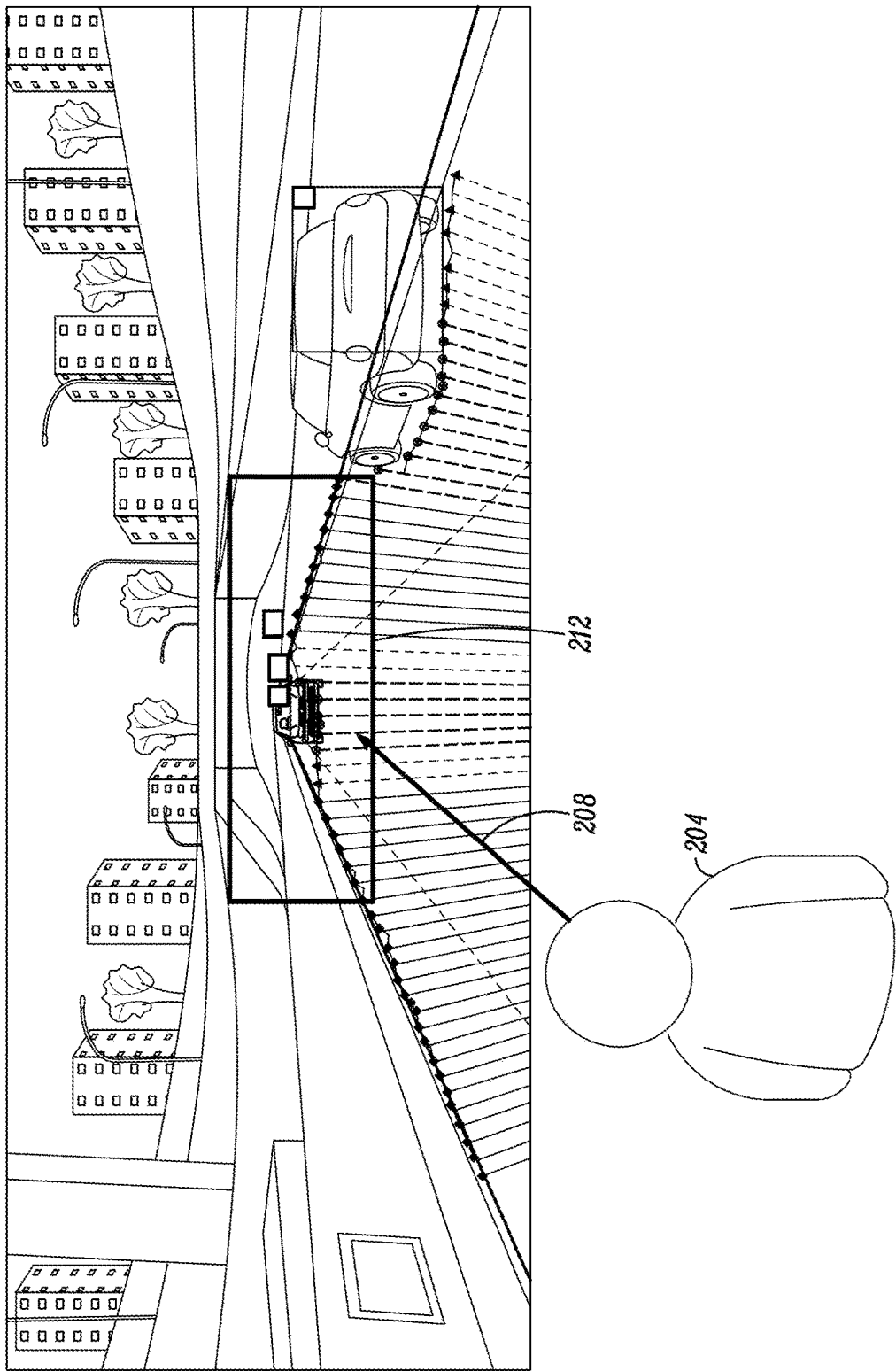
FIG. 2 includes an example illustration of a driver and a gaze vector of the driver and a fixed area.

FIG. 2 includes an example illustration of a driver 204 and a gaze vector 208 determined by the gaze module 136 based on the direction of pupils of eyes, respectively, of the driver 204. An example DMS area 212 is illustrated. In the example of FIG. 2, the gaze vector 208 intersects the DMS area 212. The gaze of the driver 204 is therefore within the DMS area 212. The gaze of the driver 204 being outside of the DMS area may indicate that the driver is not monitoring the road in front of the vehicle.

One or more actions may be taken when the gaze of the driver 204 is outside of the DMS area for a first predetermined period. For example, one or more outputs may be generated by one or more output devices 140 (FIG. 1). For example, one or more visual outputs may be visually output via one or more visual output devices (e.g., displays, lights, indicators, etc.). Additionally or alternatively, one or more audible outputs may be audibly output via one or more speakers. Additionally or alternatively, the one or more haptic outputs may be output via one or more vibrating devices (e.g., in steering wheel, in seat, etc.). When the gaze of the driver is outside of the DMS area for a second predetermined period, one or more additional actions may be taken. For example, the propulsion control module 116 may at least one of decrease torque output of the propulsion device(s) 102, apply the brakes 108, and adjust the steering (e.g., to move the vehicle to a shoulder).

The DMS area could be a fixed predetermined area or a variable area on a vertical plane that is N units of distance (e.g., meters or feet) in front of (more forward than) the vehicle (e.g., the windshield). N may be an integer greater than or equal to zero.

Figure 3:
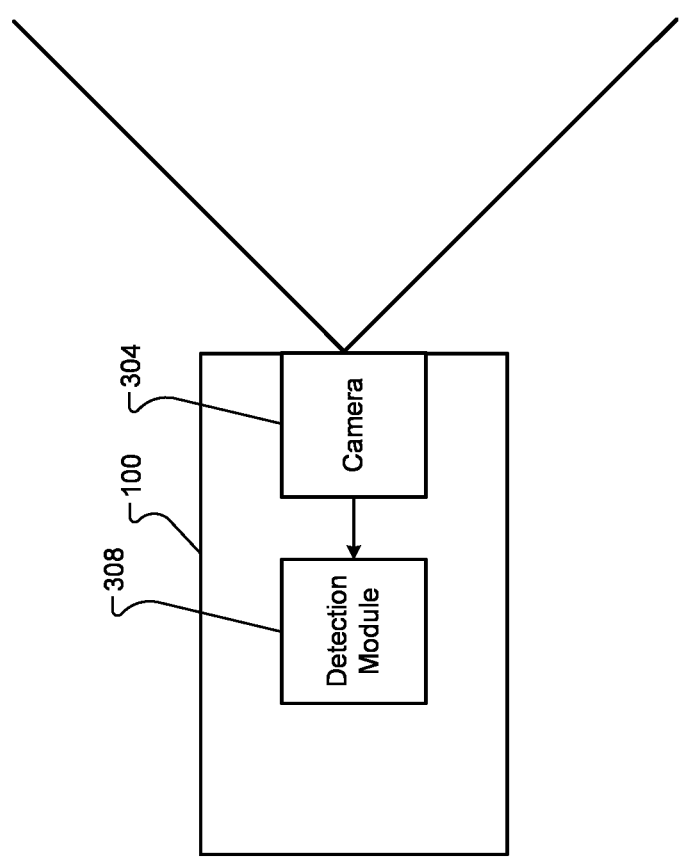
FIG. 3 is a functional block diagram of a portion of a vehicle.

FIG. 3 is a functional block diagram of a portion of the vehicle 100. The vehicle includes one or more forward facing cameras, such as forward facing camera 304. Forward facing cameras may be disposed, for example, behind a rearview mirror of the vehicle, on a front fascia of the vehicle, above a windshield of the vehicle, and/or in other suitable forward facing locations. While an example FOV of the camera 304 is shown, the FOV in front of the vehicle 100 may be greater than or lesser than the example FOV shown.

A (first) detection module 308 receives the images of in front of the vehicle 100 and identifies boundaries of a road in front of the vehicle 100. The detection module 308 may, for example, identify boundaries of the road using an object (e.g., line) detection algorithm. For example, the detection module 308 may identify points on the left and right boundaries of the road in the images and connect the points to determine the left and right boundaries of the road. The tracking module 408 may fit an equation to the points on the left boundary and fit an equation to the points of the right boundary of the road using a line fitting algorithm. The detection module 308 may also detect other objects and conditions in front of the vehicle using images from the camera 304, images from one or more other cameras 304, and/or parameters from one or more other sensors of the vehicle and/or data sources.

Figure 4:
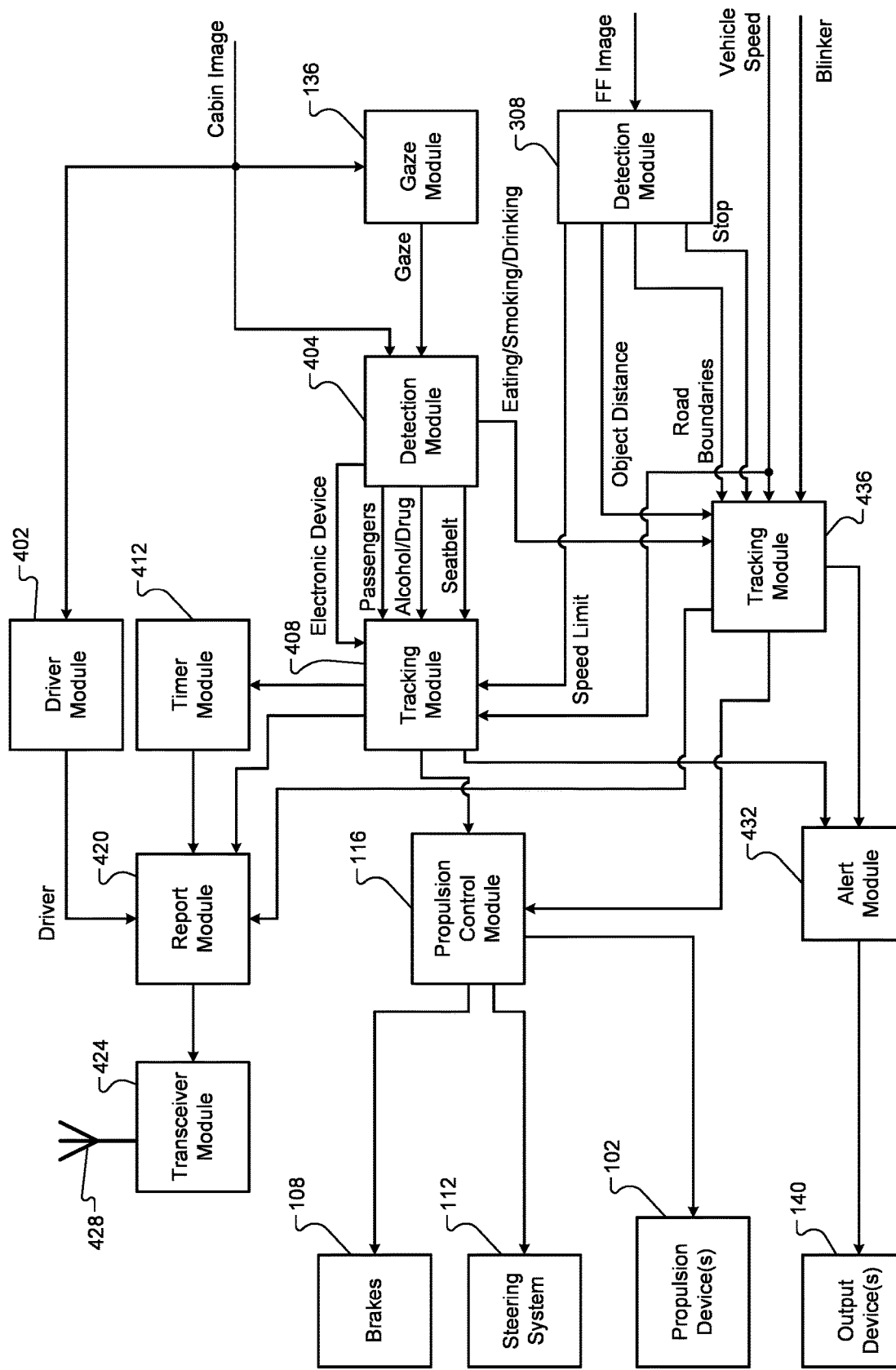
FIG. 4 is a functional block diagram of an example driver reporting and aid system.

FIG. 4 is a functional block diagram of an example driver reporting and aid system 100. As discussed above, the gaze module 136 determines the (present) gaze of the driver based on the direction of the pupils of the driver in images (cabin images) captured by the camera 132. The cameras 132 and 304 may capture images at a predetermined rate, such as 60 hertz or another suitable rate.

A driver module 402 determines a present driver of the vehicle based on images from the camera 132. For example, drivers of the vehicle may position their faces within the FOV of the camera 132 and move in a predetermined pattern to initially capture facial recognition profiles for the drivers, respectively. The driver module 402 can therefore later identify the present driver of the vehicle using facial recognition and images from the camera 132 by matching to stored facial recognition profiles.

Youth drivers seeking to obtain licensing may input a present age with his or her facial recognition profile. For example, a driver profile may include a present age of a driver, a present driver's license level of the driver, and a facial recognition profile for the driver. Tracking and reporting for licensing and alerts may be provided for youth drivers seeking increased (drivers) licensing from a licensing body as discussed further below. The following tracking, reporting, and alerting may be performed for youth drivers that do not yet have a full license, but may be disabled for fully licensed drivers. A present driver's license level of the driver may be determined from the driver's profile stored in memory.

One or more conditions and/or objects may additionally be detected based on images from the camera 132. For example, a (second) detection module 404 may detect usage of an electronic device (e.g., a cellular phone) by the driver based on images from the camera 132. The detection module 404 may detect usage of an electronic device by the driver based on the gaze being downward for a predetermined period or the gaze of the driver meeting one or more predetermined criteria. The detection module 404 generates an electronic device signal that indicates whether usage of an electronic device by the driver is detected.

The detection module 404 may also detect more than a predetermined number of passengers within the vehicle based on images from the camera 132. The predetermined number of passengers may be set based on a licensing level of the driver. The detection module 404 may detect passengers within the vehicle using object (e.g., passenger) detection or in another suitable manner. The detection module 404 generates a passengers signal that indicates whether more than the predetermined number of passengers are present within the vehicle. The predetermined number of passengers may be, for example, 1 youth passenger or another suitable number.

The detection module 404 may also detect that the driver is not wearing a seatbelt based on images from the camera 132. The detection module 404 may detect location and orientation the seatbelt, for example, using object detection. The detection module 404 generates a seatbelt signal that indicates whether more the predetermined number of passengers are present within the vehicle.

The detection module 404 may also detect whether the driver is under the influence of (or consuming) one or more drugs and/or alcohol based on images from the camera 132. The detection module 404 may detect alcohol and/or drug usage when the gaze of the driver or the pupils of the driver meet one or more predetermined criteria. The detection module 404 generates an alcohol/drug device signal that indicates whether usage of an electronic device by the driver is detected.

A tracking module 408 tracks the driver, driving of the driver, and other occurrences within the passenger cabin. The tracking module 408 increments a timer tracked by a timer module 412 as time passes while all of the following occur: (1) the driver is not using any electronic devices, (2) not more than the predetermined number of passengers (e.g., the driver+1) are present within the vehicle, (3) no alcohol or drug usage is detected, (4) the driver is wearing their seatbelt properly, and (5) the present speed of the vehicle is not greater than a present speed limit at the location of the vehicle by more than a predetermined amount. The tracking module 408 may reset the timer to zero when one or more of the following occur: (1) the driver is using one or more electronic devices, (2) more than the predetermined number of passengers are present within the vehicle, (3) alcohol or drug usage is detected, (4) the driver is not wearing their seatbelt properly, and (5) the present speed of the vehicle is greater than the present speed limit at the location of the vehicle by more than the predetermined amount. The timer therefore tracks the period that (1)-(5) are simultaneously satisfied continuously while driving. The tracking module 408 may determine whether (1)-(5) are satisfied at a predetermined rate, such as 60 hertz or another suitable rate. The predetermined amount may be calibrated and may be, for example, 7 miles per hour or another suitable amount. The vehicle speed may be measured using one or more sensors (e.g., wheel speed sensors) of the vehicle or determined, such as based on movement of one or more objects in images captured using the camera 304, GPS data, or in another suitable manner.

The detection module 308 may detect the present speed limit, such as based on an image captured by the camera 304. The detection module 308 may, for example, detect a speed limit sign in an image captured by the camera 304 and read the speed limit, such as using optical character recognition (OCR). In various implementations, a global positioning system (GPS) module may determine a present location of the vehicle 100 using signals from satellites of a GPS. The GPS module may determine a heading of the vehicle 100 based on a change in the present location relative to a previous location of the vehicle 100. The detection module 308 may determine the present speed limit at the location of the vehicle based on the present location and heading of the vehicle 100 using a database of speed limits indexed by locations and headings. In various implementations, the detection module 308 may receive the present location and heading of the vehicle 100 from a mobile device (e.g., a cellular phone) connected to the vehicle 100, such as via a Universal Serial Bus (USB) port.

A report module 420 may selectively generate a report for the driver. For example, the report module 420 may generate a report for the driver periodically (e.g., monthly), or when predetermined requirements for transitioning to a next higher level of driver's licensing (relative to the present level of the driver) are satisfied. For example, the report module 420 may generate a report for the driver when the driver is at least a predetermined age for transitioning to the next higher level, the timer is greater than a predetermined period (e.g., 50 hours), the driver has been in the present level for at least a predetermined period (e.g., 6 months), and a predetermined period of nighttime driving has been achieved by the driver. The report module 420 may include in the report that (1)-(5) have been satisfied continuously for the predetermined period (e.g., 50 hours). The report may also include detail regarding any time that (1)-(5) were not satisfied. The report may include a visual report that can be viewed on a display.

A transceiver module 424 may transmit the report to one or more entities via one or more antennas, such as antenna 428. The transceiver 424 may include a WiFi transceiver, a cellular transceiver, a Bluetooth transceiver, a satellite transceiver, or another suitable type of transceiver that transmits the report. Examples of entities include the licensing body from which the driver is seeking licensing, one or more parents of the driver, an insurance company or agent, and other entities. The report may be sent, for example, to email addresses associated with the entities or another type of end point.

When one or more of (1)-(5) are not satisfied, one or more actions may be taken. For example, when (1) the driver is using any electronic devices, an alert module 432 may output one or more to the driver via the output device(s) 140. The alert may be at least one of visual, audible, and haptic. When (2) more than the predetermined number of passengers (e.g., the driver+1) are present within the vehicle, the propulsion control module 116 may not allow a transmission of the vehicle 100 to be shifted out of park or shift the transmission to park. The propulsion control module 116 may slow the vehicle 100 to a stop if the vehicle 100 is moving. When (3) alcohol or drug usage is detected, the propulsion control module 116 may not allow a transmission of the vehicle 100 to be shifted out of park or shift the transmission to park. The propulsion control module 116 may slow the vehicle 100 to a stop if the vehicle 100 is moving. When (4) the driver is not wearing their seatbelt properly, the propulsion control module 116 may not allow a transmission of the vehicle 100 to be shifted out of park or shift the transmission to park. The propulsion control module 116 may slow the vehicle 100 to a stop if the vehicle 100 is moving. When (5) the present speed of the vehicle is greater than the present speed limit at the location of the vehicle by more than the predetermined amount, the propulsion control module 116 may slow the vehicle to the present speed limit (or the present speed limit plus the predetermined amount), such as by decreasing torque output of the propulsion device(s) 102 and/or applying the brakes 108.

The detection module 308 determines the boundaries of the road in front of the vehicle 100 based on images (forward facing (FF) images) from the camera 304, such as described above. The detection module 308 may the present speed limit at the location of the vehicle 100, such as discussed above. The detection module 308 may also detect one or more other objects and/or conditions based on the images from the camera 304. For example, the detection module 308 may detect stop instances (e.g., locations where the vehicle 100 should be stopped, such as stop signs and red lights). The detection module 308 may detect stop instances, such as using object detection. The detection module 308 may also detect an object (e.g., a vehicle) in front of the vehicle 100 and determine a distance between the object and the vehicle 100. This distance may be referred to as a following distance. The detection module 308 may detect vehicles using object detection.

A (second) tracking module 436 tracks driving of the driver. The tracking module 436 may prompt the alert module 432 to output one or more alerts via one or more of the output devices 140 when one or more conditions are satisfied to provide the driver with aids to improve driving.

For example, the tracking module 436 may prompt the alert module 432 to output an audible and/or visual alert to increase a following distance when a distance between the vehicle 100 and the vehicle in front of the vehicle 100. When the driver changes lanes without using the appropriate blinker (or turn signal), the tracking module 436 may prompt the alert module 432 to output an audible and/or visual alert to check blind spots before changing lanes and/or to use blinkers appropriately. A blinker signal may indicate blinker usages and non-usage.

When the driver does not bring the vehicle 100 to a complete stop (e.g., vehicle speed=0) at a stop instance, the tracking module 436 may prompt the alert module 432 to output an audible and/or visual alert to completely stop at stop signs and red lights. When the driver moves close to a lane boundary without using the appropriate blinker, the propulsion control module 116 may actuate the steering system 112 to maintain the vehicle 100 within the present lane. When the driver moves close to a lane boundary without using the appropriate blinker, the tracking module 436 may prompt the alert module 432 to output an audible and/or visual alert to watch out for lane boundaries/markings.

When the driver is eating, smoking, or drinking, the tracking module 436 may prompt the alert module 432 to output an audible and/or visual alert that it is not safe to eat, smoke, or drink, respectively, during driving. The detection module 404 may detect drinking, smoking, and eating of the driver based on images from the camera 132, such as using object detection. Depending on the present level of the driver, one or more alerts may be disabled. For example, alerts and/or actions taken may be reduced as the present level of the driver increases such that less aid is provided to drivers with higher levels.

Other example information that may be included in a report generated by the report module 420 include emotion/distress of the driver, earphone usage by the driver during driving, distracted driving (e.g., gaze outside of DMS area), obeyance/disobeyance of traffic signals, driving in predetermined (e.g., school, construction) zones, steering, rearview mirror use, blinker use, visual (e.g., eye movement) patterns of the driver, and driving with hazards. The detection module 404 may detect emotion/distress based on images from the camera 132. The detection module 404 may detect earphone use based on images from the camera 132. The detection module 404 may detect driver distraction based on images from the camera 132. The detection module 308 may detect obeyance/disobeyance of traffic signals based on the vehicle speed and images from the camera 304. The detection module 308 may detect driving in predetermined zones, for example, using measurements from vehicle sensors. The detection module 308 may detect steering (e.g., over steering), for example, using measurements from vehicle sensors. The detection module 404 may detect rearview mirror usage based on images from the camera 132. The detection module 308 may detect blinker use using the blinker signal and lane changes identified based on images from the camera 304. The detection module 404 may detect visual (e.g., eye movement) patterns of the driver based on images from the camera 132. The detection module 308 may detect driving with hazards, for example, using measurements from vehicle sensors.

Figure 5:
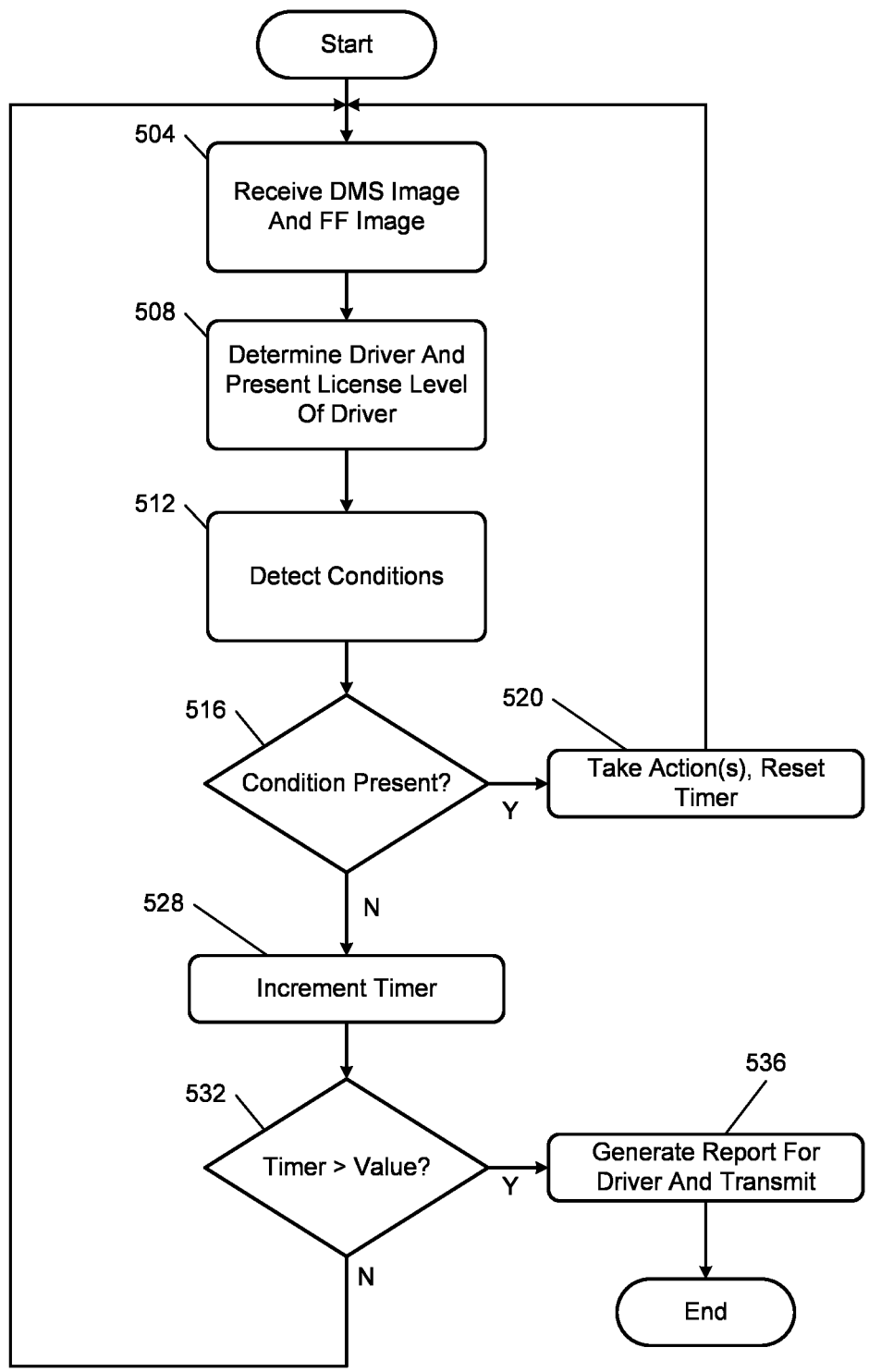
FIG. 5 is a flowchart depicting an example method of monitoring a driver and driving for reporting regarding licensing of the driver.

FIG. 5 is a flowchart depicting an example method of monitoring a driver and driving for reporting regarding licensing of the driver. Control may begin when the vehicle (e.g., ignition system) is turned on. At 504 images are captured by the cameras 132 and 304 and received. At 508, the driver module 402 determines the driver based on matching the face of the driver captured in an image from the camera 132 with a stored face in a driver profile. The driver module 402 also determines a present level of the driver.

At 512, the detection modules 308 and 404 detect the conditions inside of the passenger cabin and in front of the vehicle 100, as discussed above. At 516, the tracking module 408 determines whether a predetermined condition that cannot occur to increase the licensing level of the driver is occurring. For example, the tracking module 408 may determine whether one or more of (1) the driver is using an electronic device, (2) more than the predetermined number of passengers are present within the vehicle 100, (3) alcohol or drug use of the driver is detected, (4) the driver is not properly wearing a seatbelt, and (5) the present speed of the vehicle is greater than the speed limit at the location of the vehicle by more than the predetermined amount. For example, the propulsion control module 116 may maintain the vehicle 100 parked or park the vehicle 100, limit vehicle speed, etc. Additionally, the alert module 432 may output one or more visual, audible, and/or haptic alerts. If 516 is true, one or more actions may be taken at 520, and the tracking module 408 resets the timer value, and control returns to 504. The predetermined conditions may not occur continuously for at least a predetermined period of driving (e.g., 50 hours) to increase the licensing level of the driver. If 516 is false, control continues with 528.

At 528, the tracking module 408 increments the timer value. The timer value therefore corresponds to the period of driving by the driver that none of the predetermined conditions have occurred. At 532, the report module 402 may determine whether the timer value is greater than a predetermined value (corresponding to the predetermined period). If 532 is false, control may return to 504. If 532 is true, at 536 the report module 420 may generate the report for the driver. The transceiver module 424 may transmit the report to one or more entities, for example, to a licensing body for increasing a driver's license level of the driver, as discussed above. While the example of FIG. 5 illustrates generating the report when the timer value is greater than the predetermined value, the report module 420 may generate and transmit reports to one or more entities periodically, such as daily, weekly, monthly, or at another suitable frequency.

Figure 6:
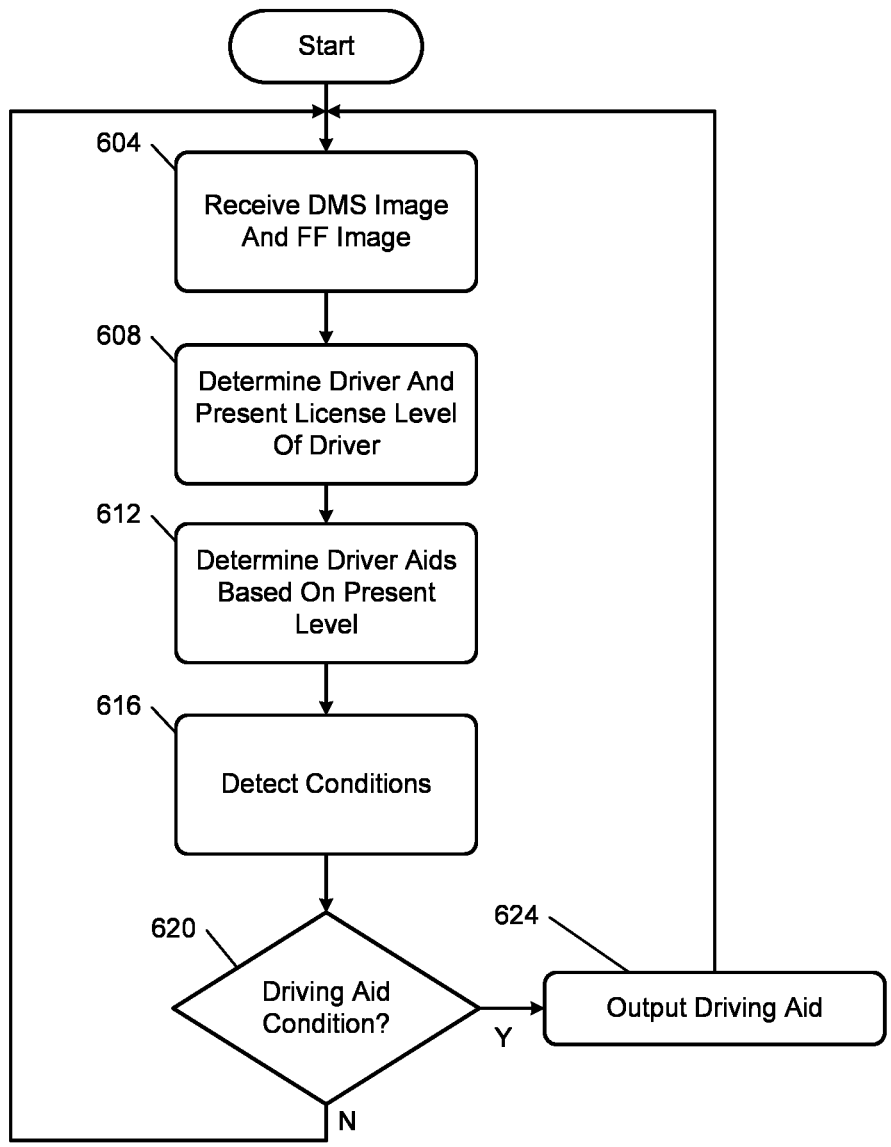
FIG. 6 is a flowchart depicting an example method of monitoring driving and selectively providing driving aids.

FIG. 6 is a flowchart depicting an example method of monitoring driving and selectively providing driving aids. Control may begin when the vehicle (e.g., ignition system) is turned on. At 604, images are captured by the cameras 132 and 304 and received. At 608, the driver module 402 determines the driver based on matching the face of the driver captured in an image from the camera 132 with a stored face in a driver profile. The driver module 402 also determines a present level of the driver. At 612, the tracking module 436 determines driver aids to be provided based on the present level of the driver, such as using a lookup table of conditions to monitor and aids to provide indexed by levels of drivers.

At 616, the detection modules 308 and 404 detect the conditions inside of the passenger cabin and in front of the vehicle 100, as discussed above. At 620, the tracking module 408 determines whether a predetermined condition for providing an aid to the driver has occurred. For example, the tracking module 408 may determine whether one or more of (a) the driver is eating, smoking, or drinking, (b) the following distance of the vehicle 100 is less than a predetermined following distance, (c) the driver failed to stop the vehicle 100 at a stop location, (d) the vehicle 100 is less than a predetermined distance from a lane boundary without signaling a lane change, and (e) the vehicle 100 changed lanes without signaling. If 620 is true, one or more driving aids may be provided at 624, and control may return to 604. For example, the propulsion control module 116 may adjust steering to provide lane keeping assistance when (d) occurs. Additionally or alternatively, the alert module 432 may output one or more visual, audible, and/or haptic alerts, which may be specific to the predetermined condition that occurred. This provides aid to the youth driver that decreases over time as the licensing level of the driver increases.

Figure 7:
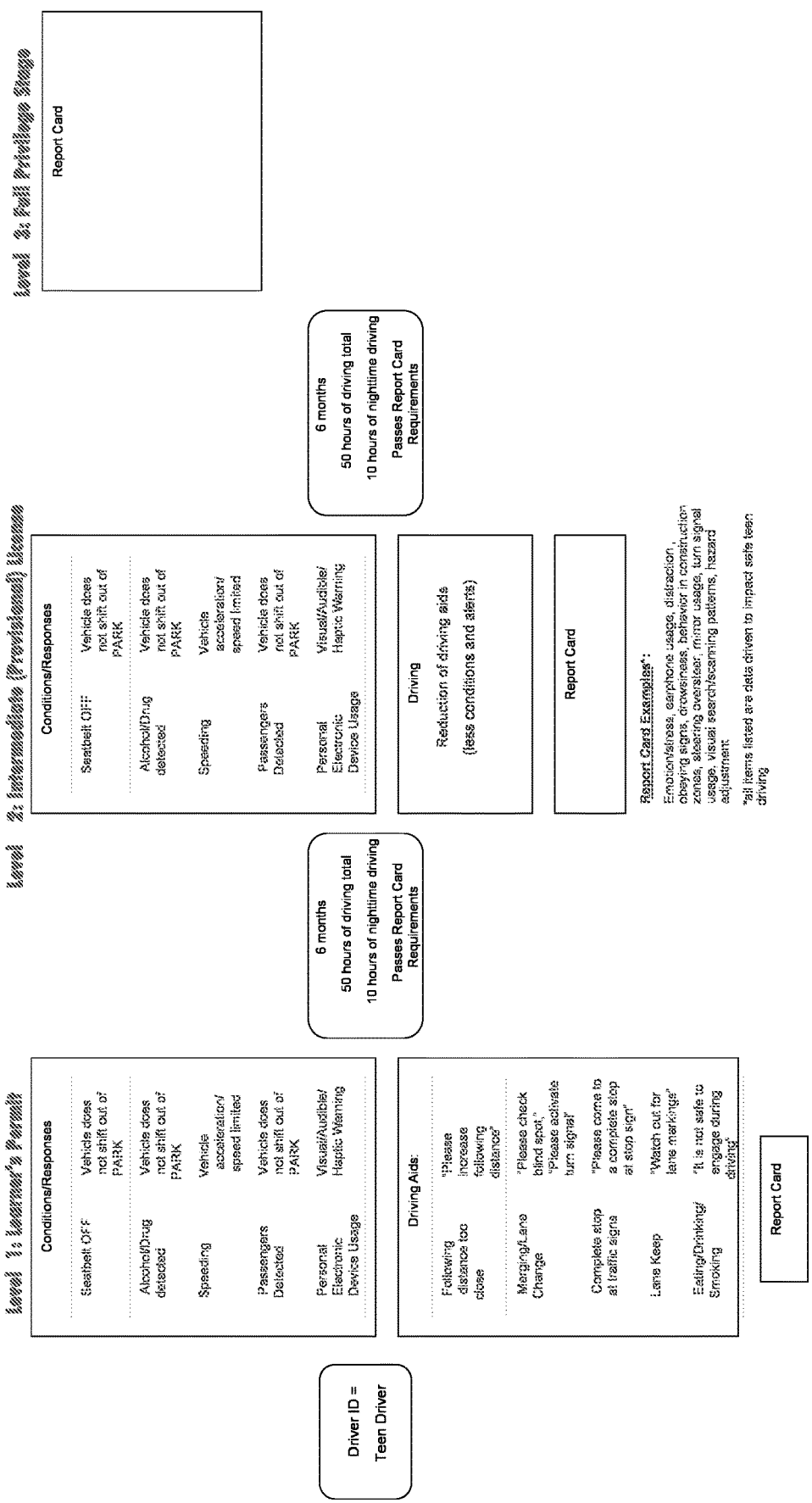
FIG. 7 is an example illustration of different conditions, driving aids, and requirements for different levels of licensing.

FIG. 7 is an example illustration of different conditions, driving aids, and requirements for different levels of licensing.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver reporting and aid system of a vehicle, comprising:
- a first camera configured to capture first images of a driver on a driver's seat within a passenger cabin of the vehicle;
- a second camera configured to capture second images in front of the vehicle;
- a driver module configured to determine a driver of the vehicle based on at least one of the first images and to determine a present driver's licensing level of the driver with a driver's licensing body based on the driver, the present driver's licensing level being less than fully licensed;
- a tracking module configured to:
  - set first conditions within the passenger cabin of the vehicle to a first set of first conditions within the passenger cabin when the present driver's licensing level of the driver is a first level;
  - set the first conditions within the passenger cabin of the vehicle to a second set of first conditions within the passenger cabin when the present driver's licensing level of the driver is a second level;
  - set second conditions outside of the vehicle to a first set of second conditions outside of the vehicle when the present driver's licensing level of the driver is the first level; and
  - set the second conditions outside of the vehicle to a second set of second conditions outside of the vehicle when the present driver's licensing level of the driver is the second level,
  - wherein second level is closer to fully licensed, and the second set of second conditions includes a lesser number of conditions than the first set of second conditions;
- a first detection module configured to detect first occurrences of the first conditions within the passenger cabin of the vehicle based on the first images;
- a second detection module configured to detect second occurrences of the second conditions outside of the vehicle;
- a reporting module configured to, based on the present driver's licensing level of the driver, selectively generate a report including first occurrences of the first conditions within the passenger cabin and the second occurrences of the second conditions outside of the vehicle; and
- a transceiver module configured to wirelessly transmit the report to a governmental driver's licensing entity.

2. The driver reporting and aid system of claim 1 wherein one of the first conditions within the passenger cabin includes the driver not wearing a seatbelt properly.

3. The driver reporting and aid system of claim 2 further comprising a propulsion control module configured to one of shift a transmission to park and to maintain a transmission in park in response to the first detection module detecting that the driver is not wearing the seatbelt properly.

4. The driver reporting and aid system of claim 1 wherein one of the first conditions within the passenger cabin includes the driver using a portable electronic device.

5. The driver reporting and aid system of claim 4 further comprising an alert module configured to, in response to the first detection module detecting that the driver is using a portable electronic device, output at least one of a visual alert via a visual output device, an audible alert via a speaker, and a haptic alert via a vibrating device.

6. The driver reporting and aid system of claim 1 wherein one of the first conditions within the passenger cabin includes more than a predetermined number of passengers being present within the passenger cabin.

7. The driver reporting and aid system of claim 6 further comprising a propulsion control module configured to one of shift a transmission to park and to maintain a transmission in park in response to the first detection module detecting that more than the predetermined number of passengers are present within the passenger cabin.

8. The driver reporting and aid system of claim 1 wherein one of the first conditions within the passenger cabin includes the driver using at least one of alcohol and drugs.

9. The driver reporting and aid system of claim 8 further comprising a propulsion control module configured to one of shift a transmission to park and to maintain a transmission in park in response to the first detection module detecting the use of at least one of alcohol and drugs by the driver.

10. The driver reporting and aid system of claim 1 wherein one of the first conditions within the passenger cabin includes the driver at least one of eating, drinking, and smoking.

11. The driver reporting and aid system of claim 10 further comprising an alert module configured to, in response to the first detection module detecting that the driver is at least one of eating, smoking, and drinking, output at least one of a visual alert via a visual output device, an audible alert via a speaker, and a haptic alert via a vibrating device.

12. The driver reporting and aid system of claim 1 wherein one of the second conditions outside of the vehicle is a distance between the vehicle and a second vehicle in front of the vehicle being less than a predetermined distance.

13. The driver reporting and aid system of claim 12 further comprising an alert module configured to, in response to the second detection module detecting that the distance is less than the predetermined distance, output at least one of a visual alert via a visual output device, an audible alert via a speaker, and a haptic alert via a vibrating device.

14. The driver reporting and aid system of claim 1 wherein one of the second conditions outside of the vehicle is a distance between the vehicle and a road boundary being less than a predetermined distance.

15. The driver reporting and aid system of claim 14 further comprising an alert module configured to, in response to the second detection module detecting that the distance is less than the predetermined distance, output at least one of a visual alert via a visual output device, an audible alert via a speaker, and a haptic alert via a vibrating device.

16. The driver reporting and aid system of claim 1 wherein one of the second conditions outside of the vehicle is a lane change without use of a turn signal.

17. The driver reporting and aid system of claim 16 further comprising an alert module configured to, in response to the second detection module detecting the lane change without the use of the turn signal, output at least one of a visual alert via a visual output device, an audible alert via a speaker, and a haptic alert via a vibrating device.

18. The driver reporting and aid system of claim 1 wherein one of the second conditions outside of the vehicle is failure to bring the vehicle to a stop at one of a stop sign and a red traffic signal.

19. A driver reporting and aid method for a vehicle, comprising:
  using a first camera, capturing first images of a driver on a driver's seat within a passenger cabin of the vehicle;
  using a second camera, capturing second images in front of the vehicle;
  determining a driver of the vehicle based on at least one of the first images;
  determining a present driver's licensing level of the driver with a driver's licensing body based on the driver, the present driver's licensing level being less than fully licensed;
  setting first conditions within the passenger cabin of the vehicle to a first set of first conditions within the passenger cabin when the present driver's licensing level of the driver is a first level;
  setting the first conditions within the passenger cabin of the vehicle to a second set of first conditions within the passenger cabin when the present driver's licensing level of the driver is a second level;
  setting second conditions outside of the vehicle to a first set of second conditions outside of the vehicle when the present driver's licensing level of the driver is the first level;
  setting the second conditions outside of the vehicle to a second set of second conditions outside of the vehicle when the present driver's licensing level of the driver is the second level,
  wherein second level is closer to fully licensed, and the second set of second conditions includes a lesser number of conditions than the first set of second conditions;
  detecting first occurrences of the first conditions within the passenger cabin of the vehicle based on the first images;
  detecting second occurrences of the second conditions outside of the vehicle;
  based on the present driver's licensing level of the driver, selectively generating a report including the first occurrences of the first conditions within the passenger cabin and the second occurrences of the second conditions outside of the vehicle; and
  selectively wirelessly transmitting the report to a governmental driver's licensing entity.

* * * * *